United States Patent

[11] 3,611,888

[72] Inventors John J. Kavalir
 Two Mountains, Quebec;
 Aron Nathan Rot, Laval, Quebec, both of Canada
[21] Appl. No. 871,266
[22] Filed Dec. 19, 1969
[23] Division of Ser. No. 730,663, May 20, 1968.
[45] Patented Oct. 12, 1971
[73] Assignee Uniroyal, Inc.
 New York, N.Y.

[54] METHOD OF SEALING EXPANSION JOINTS AND EXPANSION JOINT ASSEMBLY
 2 Claims, No Drawings
[52] U.S. Cl. .................................................. 94/18, 94/22, 260/25
[51] Int. Cl. ........................................................ E01c 11/10
[50] Field of Search ............................................ 94/18, 22; 260/28.5, 25

[56] References Cited
UNITED STATES PATENTS

| | | | |
|---|---|---|---|
| 3,179,026 | 4/1965 | Crone............................ | 94/18 |
| 3,406,087 | 10/1968 | Potter............................ | 94/18 X |
| 3,325,430 | 6/1967 | Grasley ......................... | 260/25 |
| 3,469,510 | 9/1969 | Worson......................... | 94/18 |

FOREIGN PATENTS

| | | | |
|---|---|---|---|
| 740,027 | 8/1966 | Canada ......................... | 260/28.5 AS |

Primary Examiner—Jacob L. Nackenoff
Attorney—Robert J. Patterson

ABSTRACT: A composition of matter comprising (1) a block copolymer of the A-B-A type wherein the A's typically are polymeric blocks of styrene and B is a polymeric block of a conjugated diene or such a block copolymer in hydrogenated form, (2) asphalt, (3) a compatible resin and (4) plasticizer is disclosed. This composition is advantageously used in molten form to fill and seal a concrete expansion joint. In use the walls of the joint are primed with a "cement" which effects tenacious bonding of the sealant composition when the latter solidifies.

3,611,888

METHOD OF SEALING EXPANSION JOINTS AND EXPANSION JOINT ASSEMBLY

CROSS-REFERENCE TO RELATED APPLICATION

This application is a division of application Ser. No. 730,663, filed May 20, 1968.

This invention relates to a new composition of matter which is particularly adapted for use as a hot-poured expansion joint sealant, to a method of sealing an expansion joint therewith and to the resulting concrete-paving assembly.

For many years strenuous efforts have been made to develop a satisfactory technique for sealing expansion joints in concrete highways, airport runways, and the like, in order to prevent the access of water and salt into the joint with resulting damage due to freezing of water and undesired chemical action of salt on the concrete in the joint area. So far as we are aware all previous proposals have been subject to various serious drawbacks.

It has recently been proposed to use a cured neoprene extrusion of complex multichannel cross section as an expansion joint sealant strip. According to this proposal, a cured extruded neoprene strip having narrow walls extending in crisscross fashion from on sidewall of the joint to the other sidewall is inserted in the joint so as to be under compression. Typically the strip is compressed from 50 to 5 percent prior to its insertion. With this system there is very low adhesion of the strip to the walls of the joint. Because the strip is used only in compression and is not permanently adhered to the sides of the joint, relative up and down movement of the adjoining concrete slabs as traffic passes over the joints gradually causes the strips to work loose so that they project above the pavement and soon are pushed out altogether. The loose strips are a serious traffic hazard. This propensity of the strips to come out of the joints has ruled out altogether the use of this system on airport runways because of the danger that the strips will be sucked into jet engines. Also the strips are expensive and difficult to apply.

As is shown in Report RR 118 entitled "Evaluation of Field-Moulded Sealants for Concrete Pavements and Structures" by B. Chojnacki, published in Oct., 1966 by the Department of Highways, Ontario, Canada, another approach has been to make a hot-melt sealant composition which is poured into the joint. However, efforts to date to make completely satisfactory joints by this technique have not succeeded.

Our invention involves a novel approach to the expansion joint problem. Our invention is based upon a new hot-poured type of sealant composition which is poured in molten condition into the joint, the sidewalls of which preferably have been primed with a primer (more fully described hereinafter), and is allowed to solidify in place. In our system the sidewalls of the hot-poured composition which has solidified in place in the joint are permanently bonded to the sidewalls of the joint as a result of a unique cooperation between the composition and the primer with the result that the joint is completely sealed against access of water, salt, etc. Our sealant composition is so designed that in combination with this permanent bonding feature it can expand or contract freely with the contraction and expansion of the concrete slabs without reducing or interfering with the integrity of the seal.

In practicing our invention we first prepare in any suitable way a normally solid-meltable sealant composition comprising a homogeneous mixture of (1) a thermoplastic elastomeric block copolymer selected from the group consisting of block copolymers having the general configuration A–B–A wherein the A's are polymeric blocks of alkenyl aromatic hydrocarbons typified by styrene, each A having an average molecular weight of 2,500 to 100,000 and B is a polymeric block of a conjugated diene, typified by butadiene, having an average molecular weight of 25,000 to 500,000, and hydrogenated derivatives of such block copolymers, (2) asphalt, (3) a resin compatible with the other components of the mixture and (4) plasticizer. This composition is so formulated that it does not appreciably deteriorate or decompose when heated and maintained in molten condition for a prolonged period of time at a recommended pouring temperature of 375°–400° F., its consistency at such temperature is suitable for pouring by gravity into the joint, and upon cooling it solidifies into a highly resistant elastomeric material which when subjected to the high summer temperatures (which may approach or even exceed 150° F.) commonly encountered in service retains its basic elastomeric properties whereby it can freely expand as the concrete slabs contract and can freely contract as the slabs expand, remains in position to perform its functions, is not dissipated by passing traffic and does not permit gravel, sand, and other foreign material to penetrate the material of the joint, which penetration would gradually destroy its effectiveness as an expansion-joint-sealing material.

This composition is preferably installed in the joint in the following way. The walls of the joint are coated over the areas to be contacted by the sealant with a primer comprising a "cement" which is a volatile organic solvent solution of a suitable normally solid and tacky polymeric material exhibiting good adhesive properties with respect to both the walls and the sealant. This polymeric material is preferably an "elastomer" as that term is defined by Fisher in his article, "Nomenclature of Synthetic Rubbers," Ind. Eng. Chem. 31, pp. 941–945 (1939) and is exemplified by acrylic ester polymers, neoprene, natural rubber, SBR, etc. The bulk of the solvent in the primer coating is allowed to evaporate, whereupon our molten sealant composition is poured into the joint and allowed to solidify and at the same time to coalesce with the primer to form a permanent watertight seal.

The block copolymer component of our sealant composition is fully described in Canadian Pat. 740,027 which is hereby incorporated herein by reference.

The asphalt component of our composition preferably is a petroleum asphalt having a penetration of 110 to 120. However, we are not limited to using this particular asphalt but can use many other asphalts and those skilled in the art can, in the light of this disclosure, readily select suitable asphalts and proportion the components of the mixture so as to produce a good hot-melt sealant.

Many resin components may be used. The resin must of course be compatible with the polymer, asphalt and other components. We prefer to use resins which are completely solid at room temperature but which become extremely liquid at temperatures above 200° F. and typically below 400° F. We have with excellent results used thermoplastic resins selected from the group consisting of rosin, hydrogenated rosin, polymerized rosin, polyhydric alcohol (especially glycerol and pentaerythritol) esters of rosin, hydrogenated rosin or polymerized rosin, and terpene resins, such as those described on pages 295–296 of "The Chemistry of Commercial Plastics" by Wakeman, published 1947 by Reinhold, these being exemplified by alpha- and beta-pinene resins made by polymerization of such pinenes as shown in U.S. Pat. No. 3,342,902, or the well-known terpene-phenolic reaction products which have been described in numerous U.S. Pats. such as No. 2,284,156 to Lemmer, No. 2,319,386 to Carmody, No. 2,343,845 to Powers, Nos. 2,378,436; 2,471,453; 2,471,454 and 2,471,455 to Rummelsburg, and No. 3,144,428 to Kost, each of the cited references being incorporated herein by reference. The terpene-phenol resin may if desired be modified with a carbonyl compound, typically a ketone or an aldehyde; one such modified resin is that sold as "Resin X2092" (trademark) by the Newport Division of Tenneco Chemicals Inc. which typically has the following properties:

Melting Point (Capillary Tube), °C. 92
Melting Point (Ball & Ring), °C. 110
Acid Number 0
Color (USDA Rosin Standard) WG or better
Specific gravity at 25° C. 1.05
Pounds per U.S. Gallon at 25° C. 8.7
Hydroxyl Number 186
Apparent Molecular Weight (measured in benzene) 480

We have found this resin to be particularly suitable for use in our sealant because it is exceedingly stable at the high temperature at which our sealant is poured. Other very suitable thermoplastic resins are the glyceryl and pentaerythrityl esters of hydrogenated rosin sold as "Staybelite Ester 10" (trademark) and "Pentalyn H" (trademark), respectively.

We are not limited to using thermoplastic resins but instead we may use other resins which display the required compatibility with the other components and which are normally solid but which become liquid upon heating. Examples of such resins are the thermosetting, heat-reactive oil-soluble alkaline-catalyzed condensation products of formaldehyde or acetaldehyde and a monohydric phenol having only two particularly reaction-favorable positions in the molecule and substituted only in the para position by an alkyl or aryl hydrocarbon radical containing at least four carbon atoms. These condensation products are accurately and concisely characterized as condensation polymers of 2,6-dimethylol-4-($C_4$ or higher) hydrocarbon-substituted phenols. Such resins are disclosed in detail in U.S. Pat. Nos. 2,610,910 and 2,701,895 which are expressly incorporated herein by reference. Examples of commercial resins are Rohm and Haas' "Amberol ST-137" (trademark) which is made from p-octylphenol and Union Carbide's "CKR-1634" (trademark) which is made from p-tertiary butyl phenol.

As plasticizer we can use any one or several known nonvolatile materials capable of solvating or plasticizing the polymer, resin and asphalt. Examples are so-called monomeric liquid plasticizers such as dioctyl phthalate, tricresyl phosphate, etc., plasticizing resins for example a plasticizing resin derived from urea-formaldehyde and exemplified by "Plastigen G" (trademark) made by BASF, a plasticizing polyester or alkyd resin, often termed a polymeric ester plasticizer, exemplified by the resinous polyester materials sold under the trademark "Paraplex" made by Rohm and Haas, etc., or nonvolatile petroleum oils commonly used as extender oils for rubbery materials, exemplified by "Circosol 4240/42 X H" (trademark) and "CircoLight" (trademark) oils, both made by Sun Oil Co. We particularly prefer to use a major proportion of a nonvolatile petroleum oil of the type commonly used to extend rubbery polymers, in combination with a minor proportion of petroleum-based medium grease.

Other ingredients recommended for use in our sealant composition are known antioxidants for elastomeric materials, such antioxidants typically being used in small amounts to stabilize the elastomeric polymer component of our composition, water-repellant materials such as silicone fluids, and a filler or fillers which serve to control the consistency of the molten material. We may also include a small amount of a mixture of dixylyl disulfides to prevent any tendency of the elastomer to cure during heating in manufacture or in application of the sealant composition.

The proportions of the principal components of our sealant are preferably as follows:

| | Parts by Weight |
|---|---|
| Polymer | 100 |
| Asphalt | 100–500 |
| Resin | 10–100 |
| Plasticizer | 20–150 |

In a typical method of preparing our composition, all of the components except the asphalt and plasticizer are admixed intimately in any high-shear mixer whereupon the asphalt is incorporated in small quantities until a uniform mixture is obtained. Then the plasticizer is incorporated. Extraneous heat may be applied during the mixing, beyond the heat generated by the working of the mixture in the mixer. This gives a molten mixture which is then packaged, allowed to solidify and transferred to the installation site where it is again melted in a suitable jacketed melting kettle and then poured into the joint.

The preferred primer used in installing our sealant material is made from an acrylic ester polymer compounded with a tackifier and plasticizer such as polyvinyl methyl ether, with a phenolic resin such as has been described above together with a small amount of a silicone oil which acts as a water-repellent agent, all dissolved in a suitable volatile organic solvent or solvents of known type, preferably toluol. Another slightly less preferred primer is a so-called "neoprene cement" made from neoprene compounded with an antioxidant if desired, with a phenolic resin or resins of the type commonly used in making neoprene cement and with asphalt, all dissolved or suspended (as the case may be) in a suitable volatile organic solvent or solvents of known type, preferably toluol.

The neoprene cement just described differs from conventional neoprene cements in that it contains a relatively large amount of asphalt, preferably of the same type as that in the sealant composition, which serves a number of functions one of which is that it enhances the affinity of the primer solids and the sealant for each other which results in a better bond of sealant to concrete. Typically the amount of asphalt is four to eight times as much as that of the neoprene.

We prefer to incorporate in such a neoprene cement a considerable proportion of a high-flash aromatic hydrocarbon solvent having a boiling point range such that it predominantly boils above the temperature at which the molten sealant composition is applied, i.e. above a temperature of 375°–400° F. This solvent is used in order to make the primer more heat sensitive so that it will fuse or coalesce completely with the hot-poured sealant under all conditions; thus, under some conditions, as where the ambient temperature at the installation is so low, e.g. as low as 40° F., or where the cross section of the joint is so small that unduly fast dissipation of the heat of the poured sealant occurs, omission of this high-flash solvent or failure to use it in sufficient amount can result in inadequate fusion or coalescence of sealant and primer. The amount of this high-flash solvent used typically varies from 10 to 40 percent of the total weight of the primer formulation.

Our invention lends itself readily to use with standard expansion joint techniques well known to those skilled in the art. Thus with narrow joints a cheap supporting material of any kind known to the art may be inserted in the joint at an appropriate depth to limit downward flow of sealant into the joint and get the maximum effect from our sealant compound. With wider joints, a stepcut joint such as is shown for example on page 26 of the aforementioned report of Chojnacki may be used; as will be obvious, we do not apply primer to the narrow sawcut extending below the stepped area as this will never be filled with sealant.

The following specific examples illustrate our invention more fully:

EXAMPLE 1—Preferred Sealant

| | Parts by Weight |
|---|---|
| "Kraton 101" (trademark)* | 100 |
| Asphalt (110–120 penetration) | 175 |
| Terpene resin ("Resin X2092," supra) | 60 |
| Rubber extender oil ("Circosol 4240/42 X H") | 60 |
| Medium Grease ("Duralube" (trademark) brand, British American Oil Co., Ltd.) | 20 |
| Antioxidants | 4 |
| Clay ("Paragon" (trademark)) | 30 |
| Silicone oil water-repellant ("DC-200" (trademark) manufactured by Dow) | 5 |
| Dixylyl disulfides ("Renacit VI-N" (trademark)) | 1 |

EXAMPLE 2—Preferred Primer

| | Parts by Weight |
|---|---|
| "Acryloid B—67" (trademark)ᵃ | 100 |
| "Lutonal M—40" (trademark)ᵇ | 20 |
| "CKR-1634" (described supra) | 30 |

EXAMPLE 2—Preferred Primer—Continued

| | |
|---|---|
| "DC-200" (described supra) | 10 |
| Toluol | 200 |

*A styrene-butadiene block copolymer of the type shown in Canadian Patent 740,027.
ᵃ An acrylic ester polymer (resin) sold by Rohm & Haas.
ᵇ A polyvinyl methyl ether sold by BASF and used as tackifier and plasticizer.

EXAMPLE 3—Neoprene Primer

| | Parts by Weight |
|---|---|
| Neoprene | 100 |
| Antioxidant | 2 |
| "CKR-1634" (described supra) | 80 |
| Thermoplastic terpene-modified phenol formaldehyde resin, typically having a capillary melting point of about 335° F. (such as "Durez 12603" (trademark) by Hooker Chemical). | 80 |
| Asphalt (110-120 penetration) | 600 |
| High flash aromatic hydrocarbon solvent having a boiling point range of from 380° F. to 540° F. (such as "Solvent STB" (trademark) made by Canadian Mineral Spirits Company Limited. | 200-500 |
| Toluol | 630 |

Our sealant composition has nearly ideal physical properties for expansion joint purposes. Typically the elongation of our solidified sealant compound ranges from 800 percent to over 1,100 percent over a temperature range of from −40° F. to +120° F.; this range embraces the temperatures commonly encountered in this country. Its resiliency and hardness are such as to prevent the undesired penetration of stones, gravel, etc. into the joint, which would destroy its effectiveness, and yet the hardness is not so great at subzero temperatures, which may be as low as −40° F., as to make it brittle. With regard to elasticity, the material returns, after elongation to 200 percent, almost immediately to its original length and, after elongation to 1,100 percent, returns to 130 percent of its original length within 1 minute and to its original length within 5 minutes.

The fact that the sealant material of our invention is uncured, no curatives for the elastomeric thermoplastic copolymer being used, is a key factor in the success of our system since it enables the requisite permanently strong adhesive bond between the sealant and the walls of the joint to be rapidly achieved as a result of simple physical action.

Another important attribute of our sealant composition is that it is free, or essentially free, from material which would be volatilized during the melting operation, that is at the usual melting temperature of 375°–400° F. This is important in that it eliminates loss by volatilization and reduces fire hazard and shrinkage in the joint.

The bond between the concrete and the solidified sealant achieved by our invention is permanently resistant to the effects of water, salt and the like and at all temperatures encountered in service is greater than the tensile of the concrete and the modulus of the sealant compound. It exhibits no cold flow up to 150° F. and therefore remains in position.

While our invention is usually applied to expansion joints formed between slabs of concrete it can also be applied in exactly the manner already described to expansion joints formed between a concrete slab and a rigid steel member or between two rigid steel members, such as are often encountered in bridges.

While our composition is particularly adapted for hot-melt use in sealing concrete expansion joints which are horizontal or substantially horizontal, it may be used in other applications for which its unique properties make it adaptable. Thus it can be used for sealing vertical joints provides suitable arrangements are made to confine it within the joint until it has solidified. Alternatively, it can be used as a hot-melt adhesive for making laminated articles such as laminates of paper, wood, etc. Many other applications of our composition will suggest themselves to those skilled in the art.

It will be understood that this description of our invention is illustrative and that numerous modifications thereof can be made without departing from the spirit of our invention.

Having thus described our invention, what we claim and desire to protect by Letters Patent is:

1. The method of sealing a concrete expansion joint which comprises coating the adjacent walls of the concrete slabs forming the joint with a primer comprising a volatile organic solvent solution of an acrylic ester polymer, a polyvinyl methyl ether as tackifier and plasticizer, and a condensation polymer of a 2,6-dimethylol-4 (at least $C_4$) hydrocarbon-substituted phenol, allowing the bulk of the solvent in the primer coating to evaporate, pouring into the joint a molten sealant composition comprising the following components in the following proportions by weight:
   1. 100 parts of block copolymer of the group consisting of block copolymers having the general configuration A–B–A wherein the A's are polymeric blocks of alkenyl aromatic hydrocarbons, each A having an average molecular weight of 2,500 to 100,000 and B is a polymeric block of a conjugated diene having an average molecular weight of 25,000 to 500,000, and hydrogenated derivatives thereof,
   2. 100-500 parts of asphalt,
   3. 10-100 parts of compatible resin, and
   4. 20-150 parts of plasticizer, and allowing said molten sealant composition to solidify.

2. A concrete pavement comprising adjacent concrete slabs having spaced walls forming an expansion joint, and a sealant composition in said joint comprising a solidified mass extending from one of said walls to the other, said mass being solidified from a molten composition comprising the following components in the following proportions by weight:
   1. 100 parts of a block copolymer of the group consisting of block copolymers having the general configuration A–B–A wherein the A's are polymeric blocks of alkenyl aromatic hydrocarbons, each A having an average molecular weight of 2,500 to 100,000 and B is a polymeric block of a conjugated diene having an average molecular weight of 25,000 to 500,000, and hydrogenated derivatives thereof,
   2. 100-500 parts of asphalt,
   3. 10-100 parts of compatible resin, and
   4. 20-150 parts of plasticizer, the sidewalls of said solidified mass being permanently and strongly bonded to the walls of said joint by a primer coating comprising the evaporated residue of a volatile organic solvent solution of an acrylic ester polymer, a polyvinyl methyl ether as tackifier and plasticizer, and a condensation polymer of a 2,6-dimethylol-4 (at least $C_4$) hydrocarbon-substituted phenol.